United States Patent [19] [11] 4,079,584
Shahan [45] Mar. 21, 1978

[54] HEAVY DUTY SHACKLE

[75] Inventor: James B. Shahan, Tulsa, Okla.

[73] Assignee: American Hoist & Derrick Company, Tulsa, Okla.

[21] Appl. No.: 739,056

[22] Filed: Nov. 5, 1976

[51] Int. Cl.² ............... B21L 13/00; F16G 15/06
[52] U.S. Cl. ............................... 59/35 R; 59/86
[58] Field of Search ..................... 59/86, 35, 93; 24/201 LP; 114/114

[56] References Cited

U.S. PATENT DOCUMENTS

| | | | |
|---|---|---|---|
| 199,073 | 1/1878 | Kinney | 59/86 |
| 2,420,256 | 6/1947 | MacKenzie | 59/86 |
| 2,709,616 | 5/1955 | Larson | 59/86 |

FOREIGN PATENT DOCUMENTS 196,860  5/1923  United Kingdom .................... 59/86

Primary Examiner—C.W. Lanham
Assistant Examiner—Gene P. Crosby
Attorney, Agent, or Firm—Head, Johnson & Chafin

[57] ABSTRACT

A heavy duty shackle for use under great loads, such as in anchor lines. The shackle is formed from a cylindrical bar rod by shaping the ends to a reduced diameter, and forging the central portion into a flattened shape having the cross-section of a wide shallow U shape. The bottom surface of the central section is in the form of a portion of a circular cylinder. The ends of the bar are flattened and a central opening is forged and based for a pin. The formed bar is then bent in the form of a bow to provide an eye for the shackle, with two parallel ears spaced a selected distance apart.

7 Claims, 8 Drawing Figures

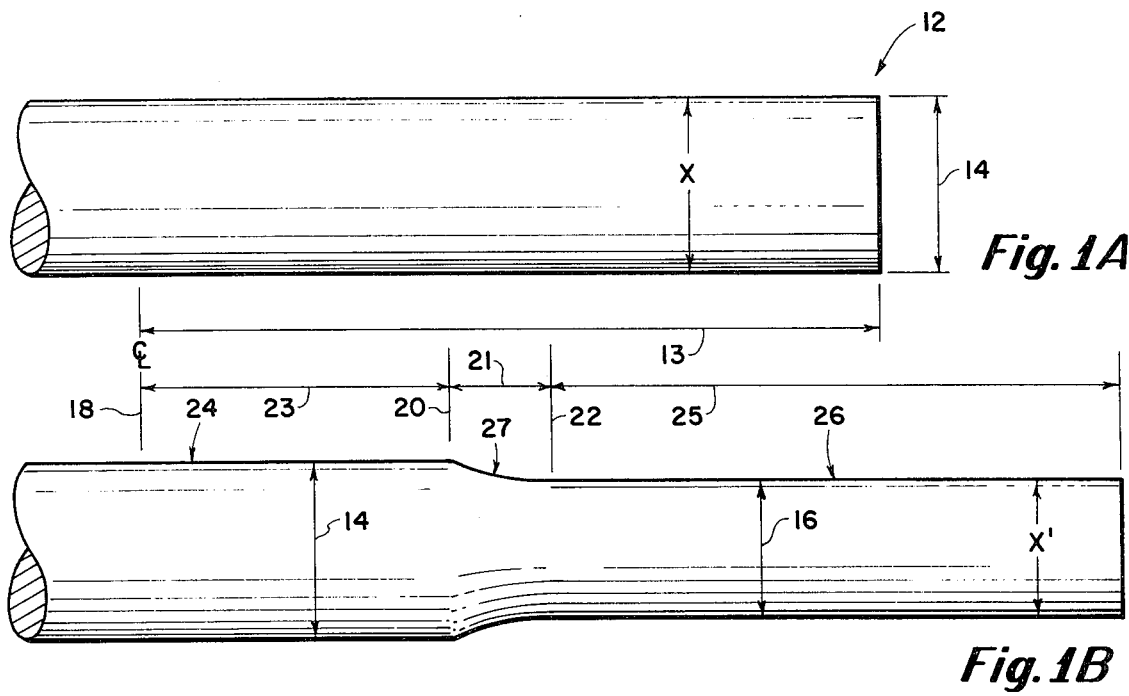
*Fig. 1A*
*Fig. 1B*
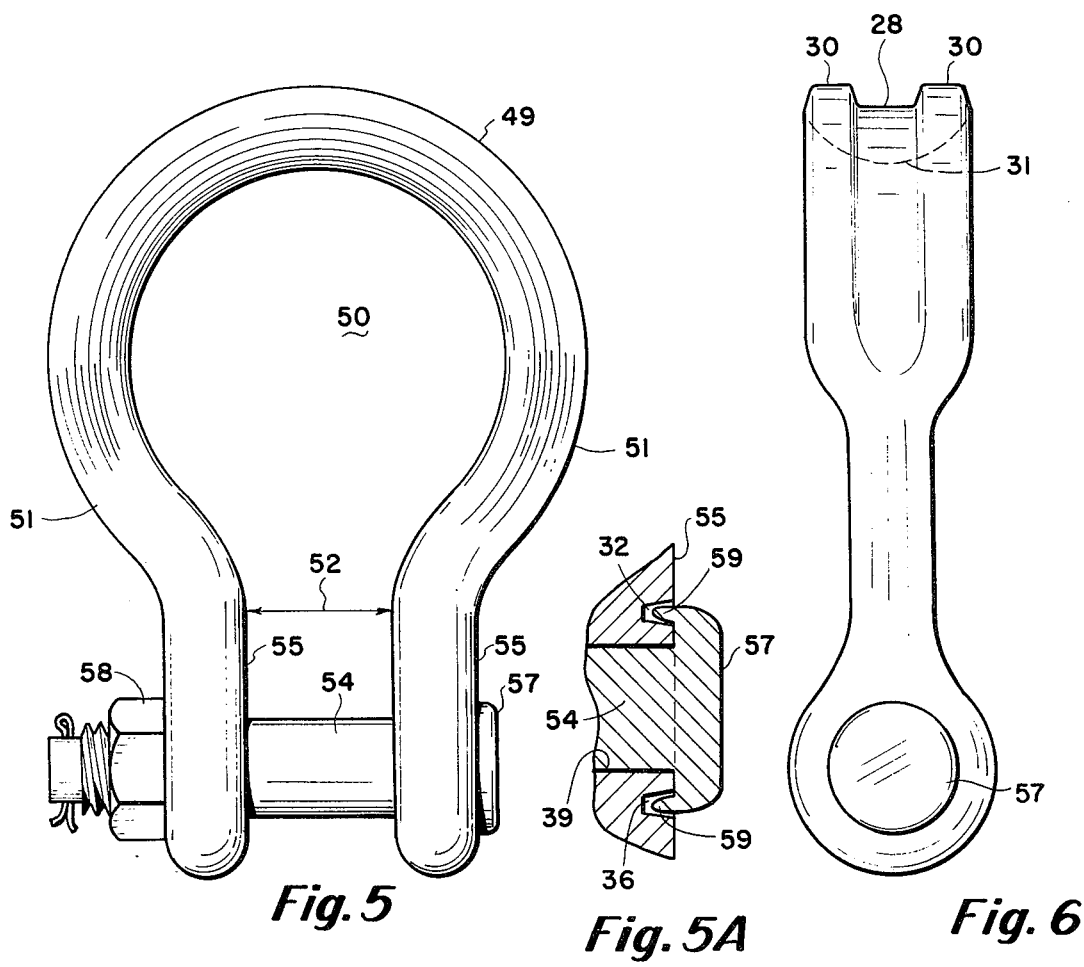
*Fig. 5*   *Fig. 5A*   *Fig. 6*

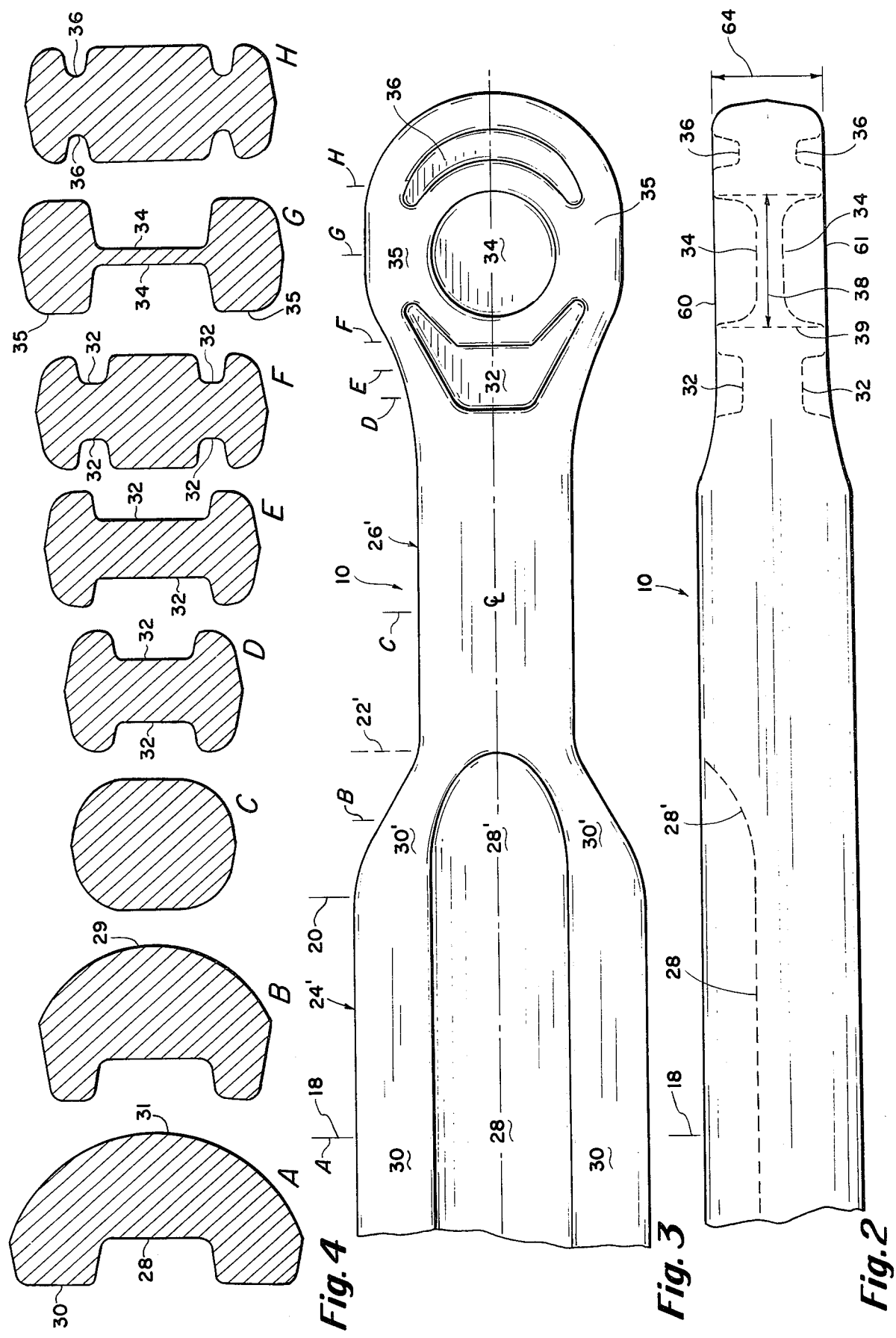

HEAVY DUTY SHACKLE

BACKGROUND OF THE INVENTION

This invention lies in the field of heavy duty cable fittings. More particularly, it concerns the design of a very heavy duty shackle, such as would be used in an anchoring system, and subjected to forces of several hundred tons or more.

In the prior art, shackles in the form of a U shape, with pins which pass through openings in the ears, have been constructed of round bar stock, which is flattened on the ends, drilled for a pin, and then bent into a U shape. Such shackle bows having a round cross-section are unsatisfactory, since they provide a very small radius around which a heavy wire rope must bend when in use. With small size wire ropes, a thimble is often used, which will provide a surface of greater radius, to support the wire rope and utilize the full strength in the wire rope. However, for very heavy loads a thimble is not practical, and there is consequently a weakness in the use of a heavy wire rope when bent around a small radius shackle.

SUMMARY OF THE INVENTION

It is a primary object of this invention to provide a heavy duty shackle bow which has a cross-section, the inner surface of which is in the shape of a part of a cylinder, which has a radius greater than the radius of the round bar from which it is fabricated.

It is a further object of this invention to provide a cross-section for the bow of a heavy duty shackle, which provides a greater length of contact between the bow and the wire rope looped through the eye of the shackle.

It is a further object of this invention to provide a cross-section of the shackle bow that has a greater section modulus than the original circular cross-section, and has a lighter weight and provides a greater strength than a bow of circular cross-section.

These and other objects are realized, and the limitations of the prior art are overcome in this invention, by manufacturing a heavy duty shackle bow from a round rod of selected length and diameter D, by first fullering the two ends to a selected smaller diameter D'. There are two short transition conical sections between the central portion of diameter D and the two end portions of diameter D'. The central portion is forged into a somewhat flattened shape which has a cylindrical surface on the bottom, and a shallow U shape on the top. The shape is much wider then the diameter D and has a greater section modulus than the original cylindrical shape.

The shape is substantially of constant thickness of cross-section, so that in heat treatment the properties of the metal will be much more uniform than where the thickness of the metal varies throughout the cross-section. The contact length between the inner surface of the shackle bow and a wire rope connected thereto, is greater than the length of contact of the inner surface of a shackle bow made out of round stock.

The radius to which the wire rope is bent around the inner surface of the shackle bow is much greater than the radius of the original bar and is at least twice that of the original bar.

The two fullered ends of the rod are flattened and broadened, and holes are forged and drilled for the pin that locks the shackle.

The forged bar is then bent in the form of a bow with a more or less circular eye, and having two ears which are spaced apart a selected distance for entry of the wire rope loop.

BRIEF DESCRIPTION OF THE DRAWINGS

These and other objects and advantages of this invention and a better understanding of the principles and details of the invention will be evident from the following description taken in conjunction with the appended drawings in which:

FIGS. 1A and 1B represent views of the original bar rod and the bar after fullering, respectively.

FIGS. 2 and 3 illustrate plan and elevational views of the forged rod.

FIG. 4 illustrates the various cross-sections of the forged rod at selected points along its length.

FIGS. 5, 5A and 6 show two views of the completed shackle, and a detail of the pin.

DESCRIPTION OF THE PREFERRED EMBODIMENT

Referring now to the drawings there is shown in FIG. 1A a view of a cylindrical rod of selected half length 13 and diameter 14 or X indicated generally by the numeral 12.

FIG. 1B shows the shape of the rod after fullering, in which the diameter of the ends has been reduced from the original diameter 14 to a lesser diameter 16 or X'. The central portion 24 of the rod now extends from the mid-point a distance 23 at the original diameter 14. There is then a short portion 27 of more or less conical transitional shape, for a length 21, to a plane 22, and then a portion 26 of length 25 of constant diameter 16.

The fullered rod 26 of FIG. 1B is then forged into the shape shown in FIGS. 2 and 3, and in the various cross-sections shown in FIG. 4. The central portion 24' as at plane 18 is flattened and broadened into a section shown in A of FIG. 4. This has on the underside a cylindrical surface 31, and on the top a flat surface 30 with a depressed central portion 28, which provides a shallow U-shaped cross-section. The radius of the cylindrical portion 31 is at least twice the radius of the original rod 12.

The depression 28 becomes shallower and narrower in the region of the rod between the planes 20 and 22, where the cross-section at plane B is shown as B in FIG. 4. Here the width of the cross-section and its radius are reduced from that of A and the shape merges into a somewhat flattened cylinder shown by C in FIG. 4, and indicated for the portion C of FIG. 3.

The end of the portion 26 of FIG. 1B is flattened and broadened in order to form a portion where there is a central opening for a pin, with sufficient material surrounding the depressions 34 to provide sufficient strength to carry the load of the shackle. In the center of this broadened portion there are depressions 34 on top and bottom surfaces 60, 61 which spread the metal outwardly to provide a thick rim 35. The depressions 34 are of somewhat lesser diameter than the diameter 38 of the opening that will be bored for the pin, shown in dashed lines 39.

In addition, the faces 60 and 61 of the ends that have been flattened to a thickness 64, have additional depressions 32 and 36 in each of the surfaces. The purpose is to thin the cross-section and to provide better heat treatment of the end portions of the shackle. These depressions 32 and 36, which are somewhat arcuate in shape, have an additional advantage as will be explained, in connection with FIGS. 5 and 6, that when the pin is inserted through the openings 39, that are bored in the ends of the ears, there may be spurs or projections on the inner surface of the head of the pin, which lock into the depressions 32 and/or 36 and lock the pin against rotation.

The next step in the manufacture of the shackle is, of course, to form the forged bar into a loop, which provides, as in FIGS. 5 and 6 an arcuate portion surrounding an eye 50, and rein sections 51 of more or less cylindrical cross-section, leading to the broader and thinner ears 55 of the shackle which are spaced apart by distance 52 less than the diameter of eye 50. When completely bent into shape, the two openings 39 are opposite each other, and a pin 54 can be inserted into the openings 39 in the ears and locked by any selected means, such as, for example, by a threaded nut 58 and/or cotter pin as shown.

In the enlarged section FIG. 5A there is shown a detail of spurs or projections 59 on the head 57 of the pin 54, which lock into the grooves 32 and/or 36.

After the customary shackle is formed, it is then heat treated, as is customary. The change in cross-section is advantageous in providing a more uniform heat treatment, and development of the full strength of the metal E.

What has been described is a method of manufacture and a very heavy duty shackle, which is forged with a specific type of cross-section, from a round bar, which better utilizes the strength of the material, has a greater section modulus, reduces the overall weight of the shackle, increases the line of bearing contact between the wire rope and the shackle, and increases the radius of the contact surface, for better utilization of the intrinsic strength of the wire rope.

By creating a specialized shape with the inner radius the equivalent to the diameter of the basic stock size of the shackle, the contact length of the rope bearing surface has been increased by 58%. This increase in bearing or contact length naturally reduces the relative amount of wear on the wire rope or shackle bow by a corresponding amount.

By doubling the radius of the contacting surface this, in effect, means that the contacting wire rope is not bent around as small a radius and it increases the usable rope strength by a factor of 15%.

By utilizing the special shape section, the section modulus is increased by 36% over what the normally-used round bar section would be.

By using a relatively constant cross-sectional thickness and keeping this dimension the same as the normally-used round bar diameter, better metallurgical properties are achieved in the quenched and tempered material to the extent of 6%.

The overall gain by the utilization of the shape section is an increased strength in the bow section of 42% over the conventionally-used round bar diameter section.

Utilizing the special-shaped section and taking advantage of the beforementioned strength increase in the section, achieves a 30–40% weight reduction over the same capacity shackle utilizing a round bar section of the same nominal configuration dimensions.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. The method of constructing a heavy duty shackle, for use under large loads, such as with anchors, from a selected length of round bar stock of diameter X, comprising the steps of:
   a. fullering, or reducing the diameter of the end portions of said bar, to a selected length, to a diameter X';
   b. forging the center portion of diameter X into a broad flat U section, with the bottom surface of the U a portion of a circular cylinder;
      wherein the radius of said circular cylinder is at least substantially equal to diameter X' and the transverse cross-section approaches approximately constant thickness;
   c. forging the ends into a section broader than, and thinner than X';
   d. forging depressions in the two surfaces of said thinner ends, said depressions approximately arcuate, around a central hub;
   e. forging central depressions on each surface of said end hubs, of diameter smaller than the diameter of the pin to be used in the shackle;
   f. bending said central portion into an arc, forming an eye, with the arms of a said U section facing outwardly, and providing two parallel ears, the spacing between said ears less than the diameter of said eye, and greater than the dimension of an object to be looped over said shackle;
   g. drilling openings through said ends concentric with said central depressions; and
   h. heat treating said shackle.

2. The method as in claim 1 including the additional steps of:
   a. providing a pin of diameter less than said opening;
   b. forming a head at one end of said pin;
   c. forming at least one spur on said head adapted to fit into one of said arcuate depressions; and
   d. providing means on the second end of said pin to lock it in the openings in said ears.

3. A shackle bow for heavy duty use under large loads, as in anchor lines, comprising:
   a. a rein section adjacent the two ends of said shackle for a selected length and of diameter X', each said rein section being between a central cylindrical portion and a flattened ear portion;
   b. said central cylindrical portion being of a broadened flattened shape, having a U-shaped cross-section with a circular bottom surface, the radius of said bottom surface being at least substantially equal to X';
   c. said shackle being in the shape of a bow, with said U-shape of said central cylindrical portion directed outwardly, around a central eye, said ears being substantially parallel, spaced apart a distance less than the diameter of said eye, and having coaxial central openings therein to receive a pin therethrough.

4. The shackle bow as in claim 3 including at least one substantially arcuate depression, substantially concentric with said central opening on the outer surfaces of said ears.

5. A shackle bow having an approximately circular eye, with two rein sections leading to two substantially parallel ears;
   the cross-section of said bow being in the form of a broad flat U section, with the bottom (inner) surface having as large a radius as possible;
   the thickness of the cross-section of said bow substantially constant;
   the cross-section of said rein section approximately circular;
   the cross-section of said ears being broad and thin, with aligned central openings, and thick flanges formed by forging central depressions in said ears; said shackle bow being heat treated.

6. The shackle bow as in claim 5 including at least one substantially arcuate depression substantially concentric with said central opening on the outer surfaces of said ears.

7. The shackle bow of claim 5 including a locked pin through said central openings.

* * * * *